(12) United States Patent
Wegmann et al.

(10) Patent No.: US 11,601,855 B2
(45) Date of Patent: Mar. 7, 2023

(54) MOBILITY FAILURE EVIDENCE-RELATED OPERATIONS

(71) Applicant: NOKIA TECHNOLOGIES OY, Espoo (FI)

(72) Inventors: Bernhard Wegmann, Holzkirchen (DE); Anna Pantelidou, Massy (FR); Arto Lehti, Massy (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 66 days.

(21) Appl. No.: 17/371,707

(22) Filed: Jul. 9, 2021

(65) Prior Publication Data

US 2023/0008394 A1 Jan. 12, 2023

(51) Int. Cl.
*H04W 36/00* (2009.01)
*H04W 36/02* (2009.01)
*H04W 24/08* (2009.01)

(52) U.S. Cl.
CPC ....... *H04W 36/0085* (2018.08); *H04W 24/08* (2013.01); *H04W 36/0058* (2018.08); *H04W 36/0079* (2018.08); *H04W 36/023* (2013.01)

(58) Field of Classification Search
CPC ............. H04W 36/0085; H04W 24/08; H04W 36/0058; H04W 36/0079; H04W 36/023
See application file for complete search history.

(56) References Cited

U.S. PATENT DOCUMENTS

| 2014/0148174 | A1* | 5/2014 | Teyeb | H04W 52/0212 455/441 |
| 2014/0295840 | A1* | 10/2014 | Keskitalo | H04W 24/10 455/436 |
| 2017/0041815 | A1 | 2/2017 | Fernandez Arboleda et al. | |
| 2018/0176836 | A1 | 6/2018 | Da Silva et al. | |
| 2021/0029600 | A1 | 1/2021 | Balan et al. | |

(Continued)

FOREIGN PATENT DOCUMENTS

| WO | 2020155094 A1 | 8/2020 |
| WO | 2020164635 A1 | 8/2020 |

OTHER PUBLICATIONS

3GPP TS 38.300 V16.6.0 (Jun. 2021), Technical Specification, 3rd Generation Partnership Project; Technical Specification Group Radio Access Network; NR; NR and NG-RAN Overall Description; Stage 2 (Release 16), Jun. 2021.

(Continued)

*Primary Examiner* — Hashim S Bhatti
(74) *Attorney, Agent, or Firm* — Squire Patton Boggs (US) LLP (57) ABSTRACT

Systems, methods, apparatuses, and computer program products for mobility failure evidence-related operations. A UE may measure, record, and report a channel access waiting (CAW) time period that elapsed from having a handover-related message in a transmission buffer until a channel for transmission of the handover-related message was obtained or until an acknowledgement or negative acknowledgement from a receiver of the handover-related message was received. The CAW time period information may be provided to a network node, and the network node may control mobility robustness optimization based on the received information.

17 Claims, 6 Drawing Sheets

(56) References Cited

U.S. PATENT DOCUMENTS

2021/0377831 A1* 12/2021 Yan .................. H04W 36/0077

OTHER PUBLICATIONS

3GPP TS 38.314 V16.3.0 (Mar. 2021), Technical Specification, 3rd Generation Partnership Project; Technical Specification Group Radio Access Network; NR; Layer 2 Measurements; (Release 16), Mar. 2021.
3GPP TS 38.331 V16.5.0 (Jun. 2021), Technical Specification, 3rd Generation Partnership Project; Technical Specification Group Radio Access Network; NR; Radio Resource Control (RRC) protocol specification (Release 16), Jun. 2021.
ETSI EN 302 567 V2.1.1 (Jul. 2017), Harmonised European Standard, Multiple-Gigabit/s radio equipment operating in the 60 GHz band; Harmonised Standard covering the essential requirements of article 3.2 of Directive 2014/53/EU, Jul. 2017.
MulteFire Release 1.1 Technical Overview White Paper, MulteFire, pp. 1-12.
Lenovo et al., "SON enhancements for NR-U," 3GPP, R2-2105806, 3GPP TSG-RAN WG2 Meeting #114-e, Online, May 19-27, 2021.
Qualcomm Inc., "Revised WID on NR-based Access to Unlicensed Spectrum," 3GPP, RP-191575, 3GPP TSG RAN Meeting #84, Newport Beach, USA, Jun. 3-6, 2019.
Rapporteur (CMCC, Ericsson), "Revised WID on enhancement of data collection for SON/MDT in NR and EN-DC," 3GPP RP-201281, 3GPP TSG RAN meeting #88-e, Online, Jun. 26-Jul. 3, 2020.
CMCC, "Revised WID: Extending current NR operation to 71 GHz," 3GPP, RP-210862, 3GPP TSG RAN Meeting #91-e, Electronic Meeting, Mar. 16-26, 2020.
International Search Report and Written Opinion dated Sep. 7, 2022, corresponding to International Application No. PCT/FI2022/050383.

* cited by examiner

MOBILITY FAILURE EVIDENCE-RELATED OPERATIONS

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for mobility failure evidence-related operations.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G can be built on a new radio (NR), but a 5G network can also be built on E-UTRA radio. It is estimated that NR may provide bitrates on the order of 10-20 Gbit/s or higher, and may support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or evolved Node B (eNB) in LTE) may be named next generation Node B (gNB) when built on NR radio and may be named next generation eNB (NG-eNB) when built on E-UTRA radio.

SUMMARY

According to a first embodiment, an apparatus may include at least one processor and at least one memory including computer program code. The at least one memory and the computer program code may be configured to, with the at least one processor, cause the apparatus at least to measure, during a handover procedure of a user equipment, one or more channel access waiting time periods associated with transmitting at least one handover-related message between a first network node and the user equipment. The at least one memory and the computer program code may be configured to, with the at least one processor, cause the apparatus at least to store information comprising the one or more measured channel access waiting time periods. The at least one memory and the computer program code may be configured to, with the at least one processor, cause the apparatus at least to provide, to a second network node, the information comprising the one or more channel access waiting time periods.

In a variant, the one or more channel access waiting time periods may start with having an associated handover-related message in a transmission buffer and may end with obtaining a channel for transmission of the associated handover-related message or receiving an acknowledgement or negative acknowledgement from a receiver of the associated handover-related message. In a variant, the at least one memory and the computer program code may be configured to, with the at least one processor, further cause the apparatus, when providing the information comprising the one or more channel access waiting time periods, at least to provide the information included in a radio link failure report. In a variant, the one or more channel access waiting time periods may include one or more uplink channel access waiting time periods. In a variant, the at least one memory and the computer program code may be configured to, with the at least one processor, further cause the apparatus, when providing the information comprising the one or more channel access waiting time periods, at least to provide the information based on a request from the second network node. In a variant, the at least one memory and the computer program code may be configured to, with the at least one processor, further cause the apparatus, when measuring the one or more channel access waiting time periods, at least to measure at least one channel access waiting time period for a preparation phase of the handover procedure and/or at least one channel access waiting time period for an execution phase of the handover procedure.

In a variant, the information may further comprise one or more of: a serving cell identifier associated with a channel access waiting time period of the one or more channel access waiting time periods measured during the preparation phase, or a target cell identifier associated with a channel access waiting time period of the one or more channel access waiting time periods measured during the execution phase. In a variant, the stored information may comprise one or more of a channel access waiting time period during the preparation phase between an event trigger and transmitting a measurement report, or a channel access waiting time period during the execution phase between an execution condition for the handover being met and transmitting the handover related message.

According to a second embodiment, an apparatus may include at least one processor and at least one memory including computer program code. The at least one memory and the computer program code may be configured to, with the at least one processor, cause the apparatus at least to receive, from a further apparatus, information comprising one or more channel access waiting time periods associated with transmitting at least one handover-related message between a first network node and a first user equipment. The at least one memory and the computer program code may be configured to, with the at least one processor, cause the apparatus at least to control mobility robustness optimization based on the received information.

In a variant, the one or more channel access waiting time periods may start with having an associated handover-related message in a transmission buffer and may end with obtaining a channel for transmission of the associated handover-related message or receiving an acknowledgement or negative acknowledgement from a receiver of the associated handover-related message. In a variant, the at least one memory and the computer program code may be configured to, with the at least one processor, further cause the apparatus, when controlling the mobility robustness optimization, at least to perform a root cause analysis for a radio link failure or a handover failure of the first user equipment based on the information, and control the mobility robustness optimization based on the root cause analysis. In a variant, the at least one memory and the computer program code may be configured to, with the at least one processor, further cause the apparatus, when performing the root cause analysis, at least to determine whether the one or more channel access waiting time periods exceed a threshold.

In a variant, the at least one memory and the computer program code may be configured to, with the at least one processor, further cause the apparatus, when controlling the mobility robustness optimization, at least to determine not to use a radio link failure report or a handover failure report for the mobility robustness optimization if the threshold is exceeded, or determine to use the radio link failure or the handover failure report for the mobility robustness optimization if the threshold is not exceeded. In a variant, the information comprising the one or more channel access waiting time periods may comprise one or more of at least one channel access waiting time period for a preparation phase of a handover procedure of the first user equipment and/or at least one channel access waiting time period for an execution phase of the handover procedure.

According to a third embodiment, a method may include measuring, during a handover procedure of a user equipment, one or more channel access waiting time periods associated with transmitting at least one handover-related message between a first network node and the user equipment. The method may include storing information comprising the one or more measured channel access waiting time periods. The method may include providing, to a second network node, the information comprising the one or more channel access waiting time periods.

In a variant, the one or more channel access waiting time periods may start with having an associated handover-related message in a transmission buffer and may end with obtaining a channel for transmission of the associated handover-related message or receiving an acknowledgement or negative acknowledgement from a receiver of the associated handover-related message. In a variant, the providing the information comprising the one or more channel access waiting time periods may further include providing the information included in a radio link failure report. In a variant, the one or more channel access waiting time periods may comprise one or more uplink channel access waiting time periods. In a variant, the providing the information comprising the one or more channel access waiting time periods may further include providing the information based on a request from the second network node. In a variant, the measuring the one or more channel access waiting time periods may include measuring at least one channel access waiting time period for a preparation phase of the handover procedure and/or at least one channel access waiting time period for an execution phase of the handover procedure.

In a variant, the information may further include one or more of: a serving cell identifier associated with a channel access waiting time period of the one or more channel access waiting time periods measured during the preparation phase, or a target cell identifier associated with a channel access waiting time period of the one or more channel access waiting time periods measured during the execution phase. In a variant, the stored information may include a channel access waiting time period during the preparation phase between an event trigger and transmitting a measurement report, or a channel access waiting time period during the execution phase between an execution condition for the handover being met and transmitting the handover related message.

According to a fourth embodiment, a method may include receiving, from a further apparatus, information comprising one or more channel access waiting time periods associated with transmitting at least one handover-related message between a first network node and a first user equipment. The method may include controlling mobility robustness optimization based on the received information.

In a variant, the one or more channel access waiting time periods may start with having an associated handover-related message in a transmission buffer and may end with obtaining a channel for transmission of the associated handover-related message or receiving an acknowledgement or negative acknowledgement from a receiver of the associated handover-related message. In a variant, the controlling the mobility robustness optimization may include performing a root cause analysis for a radio link failure or a handover failure of the first user equipment based on the information, and controlling the mobility robustness optimization based on the root cause analysis. In a variant, the performing the root cause analysis may include determining whether the one or more channel access waiting time periods exceed a threshold.

In a variant, the controlling the mobility robustness optimization may include determining not to use a radio link failure report or a handover failure report for the mobility robustness optimization if the threshold is exceeded, or determining to use the radio link failure or the handover failure report for the mobility robustness optimization if the threshold is not exceeded. In a variant, the information comprising the one or more channel access waiting time periods may comprise one or more of at least one channel access waiting time period for a preparation phase of a handover procedure of the first user equipment and/or at least one channel access waiting time period for an execution phase of the handover procedure.

A fifth embodiment may be directed to an apparatus that may include circuitry configured to cause the apparatus to perform the method according to the third embodiment or the fourth embodiment, or any of the variants discussed above.

A sixth embodiment may be directed to an apparatus that may include means for performing the method according to the third embodiment or the fourth embodiment, or any of the variants discussed above. Examples of the means may include one or more processors, memory, and/or computer program codes for causing the performance of the operation.

A seventh embodiment may be directed to a computer readable medium comprising program instructions stored thereon for causing an apparatus to perform at least the method according to the third embodiment or the fourth embodiment, or any of the variants discussed above.

An eighth embodiment may be directed to a computer program product encoding instructions for causing an apparatus to perform at least the method according to the third embodiment or the fourth embodiment, or any of the variants discussed above.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for mobility failure evidence-related operations is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar wording, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar wording, throughout this specification do not necessarily all refer to the same group of embodiments, and the described features, structures, or characteristics may be combined in any suitable manner in one or more example embodiments. In addition, the phrase "set of" refers to a set that includes one or more of the referenced set members. As such, the phrases "set of," "one or more of," and "at least one of," or equivalent phrases, may be used interchangeably. Further, "or" is intended to mean "and/or," unless explicitly stated otherwise.

Additionally, if desired, the different functions or operations discussed below may be performed in a different order and/or concurrently with each other. Furthermore, if desired, one or more of the described functions or operations may be optional or may be combined. As such, the following description should be considered as merely illustrative of the principles and teachings of certain example embodiments, and not in limitation thereof.

Aspects of NR may relate to wireless communication systems, and more particularly, to mobility robustness optimization (MRO) for NR operated in unlicensed spectrum (NR-U). NR-U may be utilized in the 5, 6 and 60 gigahertz (GHz) bands. In order to help ensure fair co-existence with other radio access technologies (RATs) like wireless local area network (WLAN) channel access may have to follow rules defined for operation in the unlicensed spectrum such as listen-before-talk (LBT), which may be used for NR-U lower unlicensed frequency bands. For higher unlicensed frequencies (e.g., 60 GHz band), different channel access methods, e.g., LBT or beamforming may be used. If beamforming is used as the channel access method, there may be operating requirements for beamforming gain, e.g., minimum directivity of the gNB and/or UE. Some variants of NR-U may not use LBT as the channel access method or may use LBT but also may allow transmission of short control signalling (SCS) without LBT. SCS may include transmitting a small amount of control data without waiting for LBT and may be limited to a maximum of, e.g., 10 percent (%) duty cycle in a 200 millisecond (ms) observation window.

In contrast to operation in licensed bands, in unlicensed bands each event-based radio transmission for signalling or reporting may experience a channel access delay either caused by e.g., LBT failure or collision when using, e.g., beamforming or SCS. As delayed signalling or reporting may impact the handover procedure, NR-U may use autonomous UE mobility (AUM), where the UE may be pre-configured with one or more potential target cells, and may autonomously execute the handover when a certain condition has been met. This may result in a relaxation of the timing of intra-frequency handover and is based on a similar principle as conditional handover (CHO) in the 3rd Generation Partnership Project (3GPP). AUM and CHO are based on similar concepts and, therefore, these terms may be used interchangeably for handover in the present disclosure.

Self-organizing network (SON) may include mobility robustness optimization (MRO) use case to optimize one or more handover parameters associated with the optimal timing of a handover process. These parameters may be optimized per cell or even cell-pair individually, since radio propagation conditions may vary from location to location. Even though the objective of CHO may be to eliminate the precise timing adjustments of a handover, optimization may still have to be used. The timely and more relaxed handover may result in uncertainty related to preparing the right target cell, if performed too early, and the execution criterion may still follow the same location-specific propagation criteria as non-conditional handover. Therefore, CHO may benefit from cell-individual optimization of the timing of the preparation and execution phases.

Figure 1:
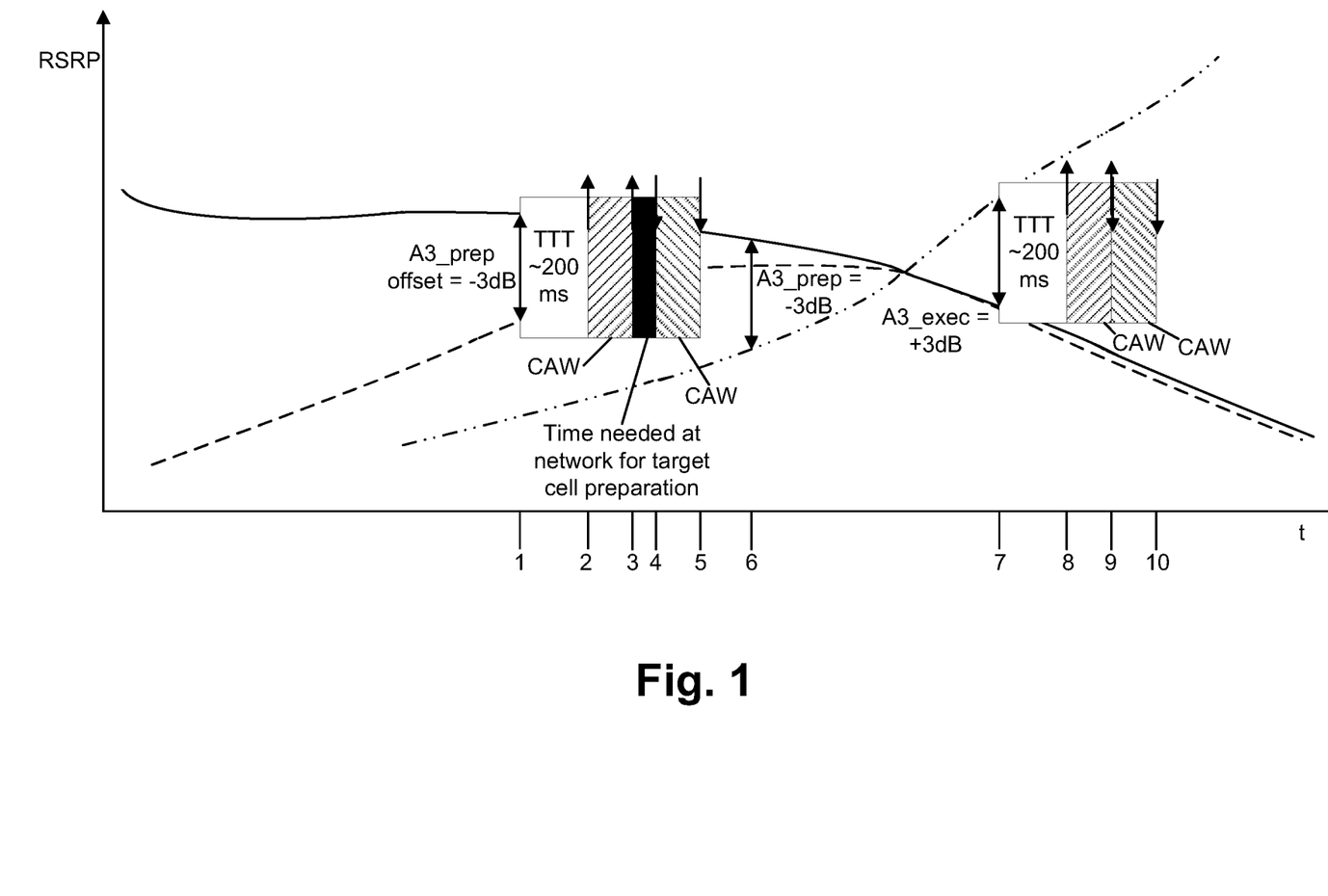
FIG. 1 illustrates example timing aspects of autonomous UE mobility, according to some embodiments.

MRO may be based on analysis of the radio link failure (RLF) report, and RLFs or handover failures (HOFs), which may be a specific kind of RLF, may be triggered by timers which are expiring or counters which are exceeding a threshold. In NR-U, event-triggered messages may suffer from waiting periods before getting channel access, and the waiting periods may interfere with the handover timing and may cause RLFs which would not happen without this waiting. Those waiting periods may be referred to herein as channel access waiting (CAW) time periods. The CAW time period may impact different CHO phases, as illustrated in FIG. 1. For instance, in NR-U, there may be several measurement events that can be used to trigger a handover, or different phases of CHO. For example, A3 measurement event may be assumed to trigger both preparation and execution phases. The corresponding A3 events may be called $A3_{prep}$ (where the corresponding offset may be, e.g., −3 decibels (dB)) and $A3_{exec}$ (where the corresponding offset may be, e.g., +3 dB). These thresholds may be configurable and MRO may adjust these thresholds. In an example described below, assuming, e.g., there are time instances 1-9 during a CHO procedure. A moving UE may experience e.g. a reference signal received power (RSRP) measurement (in NR the synchronization signal block (SSB)-RSRP) over time (t), where the RSRP values may be measured by the UE from its serving cell before handover, and the RSRP values may also be measured for one or more neighbor cells.

In the time instance 1, a first neighbor cell may fulfill the entering criterion of the $A3_{prep}$ measurement event (Offset e.g. −3 dB), i.e., the first neighbor cell may be less than 3 dB below serving cell signal strength. If the measurements continuously fulfil the conditions for the time span time-to-trigger (TTT), this event may be reported to a serving cell. In the time instance 2, the TTT may have expired (e.g., the neighbor signal may have been fulfilling the criterion over the TTT) and the UE may determine to send a measurement event report but, in the case of NR-U, the co-existence restrictions may have to be met with LBT, for instance. That is, the event reporting attempt may fail due to channel access waiting (CAW) time period. The CAW time period may include one or more failed LBT attempts or, if operating in higher frequency bands of one or more attempts to transmit using, e.g., beamforming or SCS as the channel access method, which might cause collisions and thereby fail.

In the time instance 3, event reporting may have been successful, but delayed by the CAW time period. In this case, the network may start the preparation phase with preparing the target cell(s). Since the measurement event report may include a list of neighbor cell measurements, the network may decide how many target cells are to be prepared (e.g., just the first cell which triggered the event report or the first cell and a second cell since the second cell was reported in the neighbor cell list). The preparation time may be represented by time between the time instance 3 and the time instance 4. In the time instance 4, after completion of handover preparation, the UE may have to be configured for the handover execution with a radio resource control (RRC) configuration message with conditional RRC reconfiguration (RRCConfiguration with condRRCReconfig). This may be the first attempt to send the message, but if channel is occupied by another node using the same unlicensed band, it may not be possible and another CAW time period might obstruct the configuration message.

In the time instance 5, there may have been a successful transmission of a configuration message after the CAW time period phase. Now the UE may be evaluating the target cell according to execution trigger criterion. This may be another A3 event, an $A3_{exec}$ with an offset of e.g., +3 dB, i.e., the target may have to be 3 dB higher than the serving cell. In the time instance 6, the second cell may fulfill the entering condition, and may now be prepared if not yet done with the first event reporting as described after time instance 3. If not, the described procedure between the time instance 1 and the time instance 5 may be repeated. The preparation phase may be completed at this time and, if the preparation phase has been started early enough with optimal parameter setting, the two CAW time periods in uplink (UL) and downlink (DL) may not negatively impact the mobility procedure, i.e., those CAW time periods may be eliminated with the envisaged AUM and/or CHO approach. Preparation is completed and the UE may autonomously execute the handover when the target cell fulfilled the criterion. In order to avoid a wrong cell preparation, the preparation may not start too early and, in that case, an additional delay due to the CAW time period may cause a configuration to occur too late for CHO execution and the CHO for the UE may fail.

In the time instance 7, the second cell may fulfill entering criterion for HO execution, which may be the $A3_{exec}$ measurement event (Offset, e.g., +3 dB, where the second neighbor cell may now be 3 dB stronger than the serving cell). In order to ensure a certain confidence, the measurement criterion may be observed for time interval TTT, before the handover is finally triggered with detaching from the serving cell and syncing with the new target cell by sending a random access channel (RACH) message. In the time instance 8, the UE may disconnect from the serving cell and may start to attempt to send RACH to the target cell. This may constitute an attempt because a CAW time period may occur. The T304 timer may be started with fulfilment of an execution condition (e.g., CAW time period may be included).

At the time instance 9, the random access response (RAR) in DL may be transmitted immediately, but might be delayed by the CAW time period. At the time instance 10, the RACH procedure may be successful, but may be delayed by the CAW time period.

According to some embodiments, one or more of the CAW time periods in the above example may be measured, stored by UE and/or measured and stored by a network node. For example, if 4-step RACH (which includes message 1 (msg 1) from UE to a network node, message 2 (msg2) from the network node to the UE, message 3 (msg3) from UE to a network node and message 4 (msg4) from the network node to the UE) is used, the CAW time periods may be measured and/or stored also for msg3 and msg4. The mechanism to do this may be the same as for message 1 (msg1, RACH preamble message) and/or msg2, RAR, in UL and DL, respectively. If 2-step RACH (which includes message A (msgA) from the UE to a network node and message B (msgB) from the network node to the UE) is used, the CAW time period may be measured and stored also for msgA (including a preamble on PRACH channel and data on a physical uplink shared channel (PUSCH) channel) and/or msgB in UL and DL, respectively. Another option may be the introduction of UL and/or DL-specific CAW time period measurement and storing. In such cases, the stored CAW time period may be, e.g., the sum or mean CAW time period for the transmission of the corresponding messages in the RACH procedure, e.g., msg1 and msg3 for UL in case of 4-step RACH. Additionally or alternatively, it can be the sum or mean CAW time period for the transmission of the msgA PRACH preamble and msgA PUSCH data for UL in case of 2-step RACH. Downlink CAW time period may not be measured and/or reported by the UE, but can be recorded at the network, e.g., as part of the UE context, and may be used in addition for the root cause analysis in case of failure as part of mobility failure evidence analysis. The network may also retrieve stored CAW time period information from another gNB or central unit (CU) or distributed unit (DU).

Although a CHO procedure as described with reference to the above example may result in a successful RACH and synchronization with a target cell, the mobility operation in an unlicensed band may experience additional waiting periods. Thus, without the CAW time period measurement storage and its analysis in case of failure, there may be issues if the MRO is applied to CHO, since MRO, which tries to optimize parameter settings for the timing of preparation and execution, may get spoiled if too long CAW time periods are involved. For instance, there may be problems related to determining what operations to perform if the RLF occurred during the mobility procedure, e.g., in NR-U. If the RLF report (recorded at the UE) of a failing CHO does not contain information about the experienced CAW time periods, but just includes the information that the LBT is to be applied for NR-U, e.g., it may be known that LBT can happen, but there may be no information provided to the network about the waiting time itself and the possible impacts to the occurred RLF.

A specific type of RLF failure may be caused by consistent LBT failures, but this may be a LBT issue and not a mobility issue. However, it may be unclear how far the CAW time period could have impacted the RLF, such as that resulting in a failed CHO. The CAW time period may depend on the cell load situation and the used channel access method. Thus, the CAW time period may be short or even non-existent, and hence negligible. Therefore, if a failure occurs (e.g., a RLF and/or a HOF), it may be beneficial to know in which phase this happened and the length of the CAW time period. This information proposed to be measured and used in the present disclosure may help the network to determine if a failure belongs to mobility issues (being covered by MRO) or if it is, for instance, an LBT issue (e.g., covered by another LBT-specific SON method). As can be understood from the above, there may be a need for mobility failure evidence-related operations.

Some embodiments described herein may provide for mobility failure evidence-related operations. For instance, certain embodiments may measure, record and provide a channel access waiting (CAW) time period that elapsed from having a handover-related message in a transmission buffer until a channel for transmission of the handover-related message was obtained or until an acknowledgement or negative acknowledgement from a receiver of the handover-related message was received. The handover related message may include an event triggered measurement report, an RRC reconfiguration message for handover, msg1, msg2, msg3, msg4, msgA, or msgB. In an embodiment, the storing or recording of the CAW time period may be performed separately in preparation and execution phases at the UE. According to some embodiments, the CAW time period in the preparation phase may be stored on the UE for obstructed UL transmission (e.g., a measurement event report, which may be a particular type of event-triggered message) together with the primary cell identifier (Source-PCellId) of the serving cell being addressed for measurement event reporting. In some embodiments, some CAW time periods in the preparation phase may be stored on the network at the serving eNB or gNB for obstructed DL transmission (e.g., RRC configuration) as a response to the received measurement report to trigger the handover execution. The CAW time periods experienced in the execution phase may be stored on UE together with a cell identifier of the target cell (e.g., a Target primary cell ID, PCellID) and may be stored on the network at the target gNB or eNB in the case that RAR may not be sent immediately.

In certain embodiments, the stored CAW time period information on the UE may be added to an RLF report in case of a radio link failure or HOF. The total CAW time periods for both phases may be determined during a root cause analysis procedure started by the eNB or the gNB receiving the RLF report. In some embodiments, the CAW time period value stored on the network may be retrieved as part of the root cause analysis procedure. Depending on the UE's re-establishment or re-connection after the RLF, various intra-network messages may be used for exchanging the CAW time period information. For example, the UE may be re-connected after RLF to the previous source cell served by e.g., an eNB or gNB. The UE may provide a RLF report including the CAW time period to the source cell, and the stored failed PCellID in the RLF report may be the target-PCellID. This may be a case where a handover to the target cell fails, and after handover failure the UE was re-connected to the previous serving cell. In this case, the source eNB or gNB may send a failure indication message or another message to the target eNB or gNB (targetCell) requesting the CAW time period experienced in the DL and stored by the target gNB for the UE. The target e/gNB may send, in a handover report or in another message, information about the DL CAW time period (e.g., related to transmission of a RAR message).

As another example, the UE may be re-connected after RLF to the target cell served by a eNB or gNB. The UE may send a RLF report including the CAW time period to its serving cell (the target cell before RLF), and the failed PCellID in the RLF report may be the target-PCellID, which may also be the reconnected primary cell identifier (PCellID). This may be the case where a timer (e.g., T304 timer) expires during handover, but then the UE re-connected to the target cell. In this case, the target eNB or gNB may send a message to the source eNB or gNB hosting the previous PCellID (indicated in the RLF report) requesting the stored DL CAW time period during the preparation phase. The source eNB or gNB may send a handover report or another message with information about the CAW time period during the preparation phase.

As another example, the UE may be re-connected after RLF to a third cell. In this case, the eNB or the gNB hosting this cell may send messages to both the e/gNBs hosting the previous source cell (previous PCellID in the RLF report), and the envisaged target cell (failed PCellID in the RLF report) requesting the DL CAW time period information during the preparation phase and during the execution phase (before RAR).

Based on a total CAW time period analysis with respect to the different phases, it may be decided if this failure may be taken into account for MRO statistics or another SON method, which may optimize the NR-U related radio access. In this way, certain embodiments may provide for reliably detecting channel access failures from other mobility-related problems when MRO is used. Since certain embodiments may measure channel access delay, it may be independent of the channel access method used. Thus, unlicensed bands and regional regulations can be handled by one method, thereby conserving computing and/or memory resources associated with sending and/or storing multiple configurations.

Figure 2:
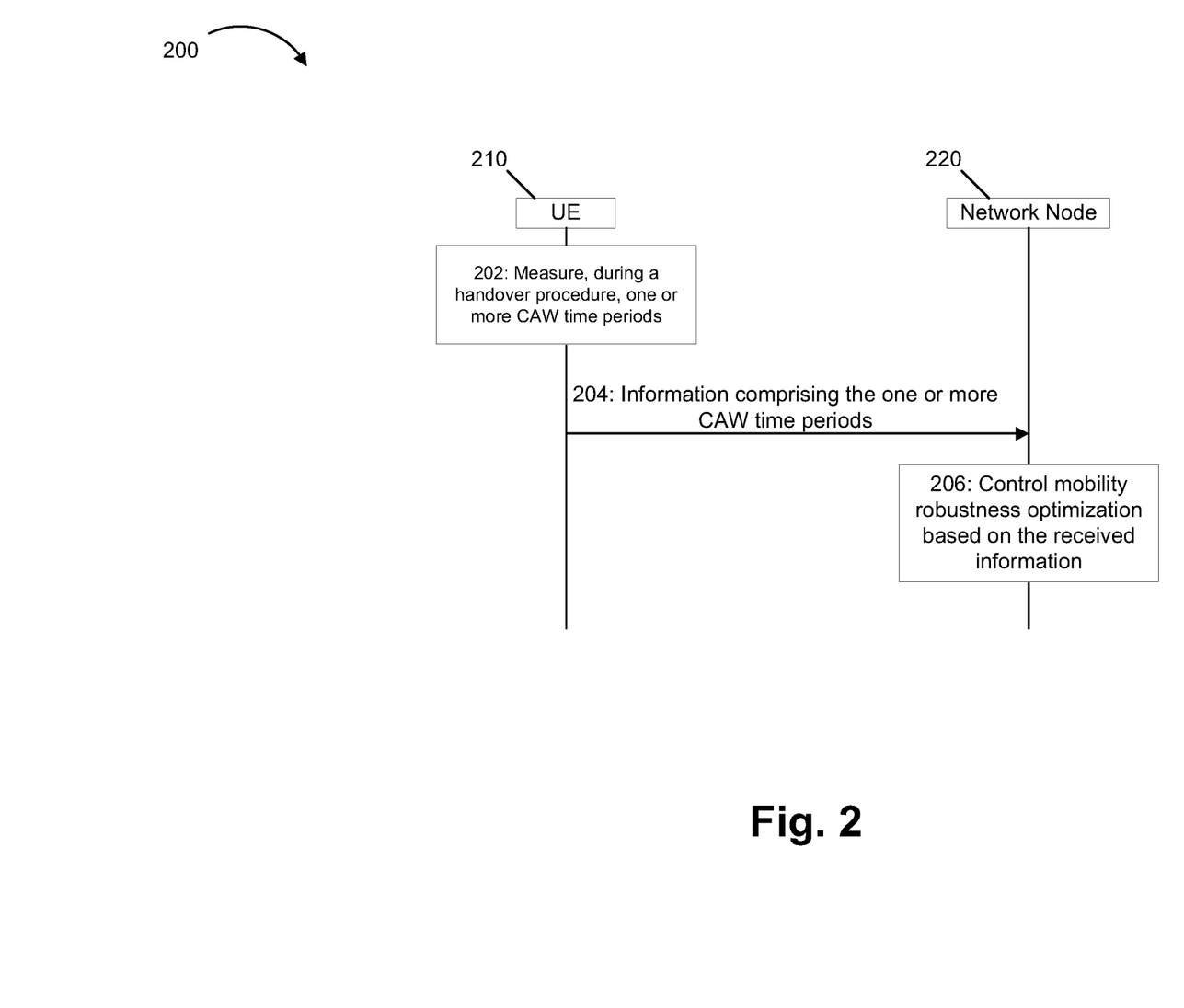
FIG. 2 illustrates an example of mobility failure evidence-related operations, according to some embodiments.

FIG. 2 illustrates an example 200 of mobility failure evidence-related operations, according to some embodiments. As illustrated in FIG. 2, the example 200 includes a UE 210 and a network node 220.

As illustrated at 202, the UE may measure, during a handover procedure (e.g., a handover or a CHO), one or more channel access waiting (CAW) time periods. The CAW time period starts from a first attempt (indicated with the entry of the handover-related message in the transmission buffer) for transmitting an uplink message to a network node (e.g., the same or different than the network node 220 illustrated in FIG. 2). For example, the uplink message may be sent to a target cell gNB for handover, and the network node in FIG. 2 may be a network node controlling a cell which the UE re-connected to after a handover failure. The CAW time periods ends with obtaining a channel for transmission of the handover-related message or receiving an acknowledgement or negative acknowledgement from a receiver of the handover-related message. When measuring the CAW time periods, the UE may measure the CAW time periods for a preparation phase of the channel access procedure and/or CAW time periods for an execution phase of the channel access procedure.

The UE may store the CAW time periods together with a cell (e.g., a primary cell) identifier of the serving source cell, if the CAW time periods are measured during the preparation phase. Alternatively, the UE may store the CAW time periods together with a cell identifier of the target cell, if the CAW time periods are measured during the execution phase.

As illustrated at 204, the UE may transmit, and the network node may receive, information comprising the one or more CAW time periods (e.g., the first and/or the third CAW time period shown in FIG. 1). As described above, the network node 220 may be the same as, or different from, the network node to which the UE attempted to transmit the uplink message (e.g., an event triggered report, or a random access message) during the handover procedure or a mobility procedure. The UE may transmit the information at 204 in a radio link failure (RLF) report or after a request from the network node 220. That is, the transmission of the information comprising the one or more CAW time periods from the UE may be event triggered or request triggered. In some embodiments, the UE may transmit the information after occurrence of a RLF or a handover failure. The information may be received at 204 in a RLF report by the network node 220. In some embodiments, the network node 220 may send a request for the information to the UE, and the information may be received at 204 after sending the request.

As illustrated at 206, the network node may control mobility robustness optimization based on the received information. When performing the optimization at 206, the network node may perform a root cause analysis for a RLF or a handover failure of the UE based on the information received at 204, and may control the mobility robustness optimization based on the root cause analysis.

The network node 220 may measure, during a CHO of another UE (not shown in FIG. 2), one or more CAW time periods. The CAW time period starts from having a handover-related message in a transmission buffer until a channel for transmission of the handover-related message was obtained or until an acknowledgement or negative acknowledgement from a receiver of the handover-related message received. Additionally, the network node may send a report of the measured CAW time periods to another network node (not shown in FIG. 2), e.g., a network node to which the other UE connected to. Additionally, or alternatively, the network node may receive a report of one or more CAW time periods related to the UE 210 or the other UE from the other network node (e.g., a network node of a target cell with which the UE 210 or the other UE fails to connect). In this way, the information comprising one or more CAW time periods may be distributed in a plurality of network nodes. In some embodiments, the UE may send and the network node may receive one or more cell identifiers associated with the CAW time period(s), e.g., an identifier of a cell involved in a conditional handover. For instance, the cell may be the one to which an event triggered measurement report is sent by the UE, or the one to which a random access Msg1 is sent by the UE.

In this way, the UE may record the CAW time periods for event-triggered messages as part of the mobility procedure. An event-triggered message may include a message that is sent according to an event (e.g., a message sent based on a measured RSRP falling below a threshold). Additionally, or alternatively, an event-triggered message may include a report stored by a UE according to an event (e.g., an RLF report stored by the UE when the RLF is detected by the UE or a RACH report whose entries are created by a UE when a RACH procedure fails). In order to record these CAW time periods on the UE, the UE may be configured with a UE-related variable (e.g., varLogCAW), which may include one or more entries for event-triggered CAW time periods. For example, two entries of the variable may include an entry for a CAW time period during the preparation phase that the UE may have to wait before sending a report to the network even though the event trigger has been met (e.g., a CAW the UE may have to wait before sending an event triggered measurement report, which may be denoted as measurementEventReportCAW) which may take an integer value of 0 . . . 172800 and an entry for a CAW time period during the execution phase and may be related to how long the UE may have had to wait before it could perform a RACH to a target even though an execution condition is satisfied (e.g., a CAW the UE may have to wait before sending a RACH message (e.g., msg1, msg3 or msgA), and the CAW may be denoted as RACHtotargetcellCAW) which may take an integer value of 0 . . . 172800. Note that, the above type (integer) and maximum values (172800) for CAW time periods are examples. CAW time periods may also be of another type (e.g., float, double, etc.) and may have other maximum values. Before sending a measurement event-triggered report, the UE may reset the variable varLogCAW. In the case of an RLF, the varLogCAW can be either added to the RLF report. Network may retrieve the RLF Report including CAW time period information from the UE through UE information request/response procedures.

Figure 3:
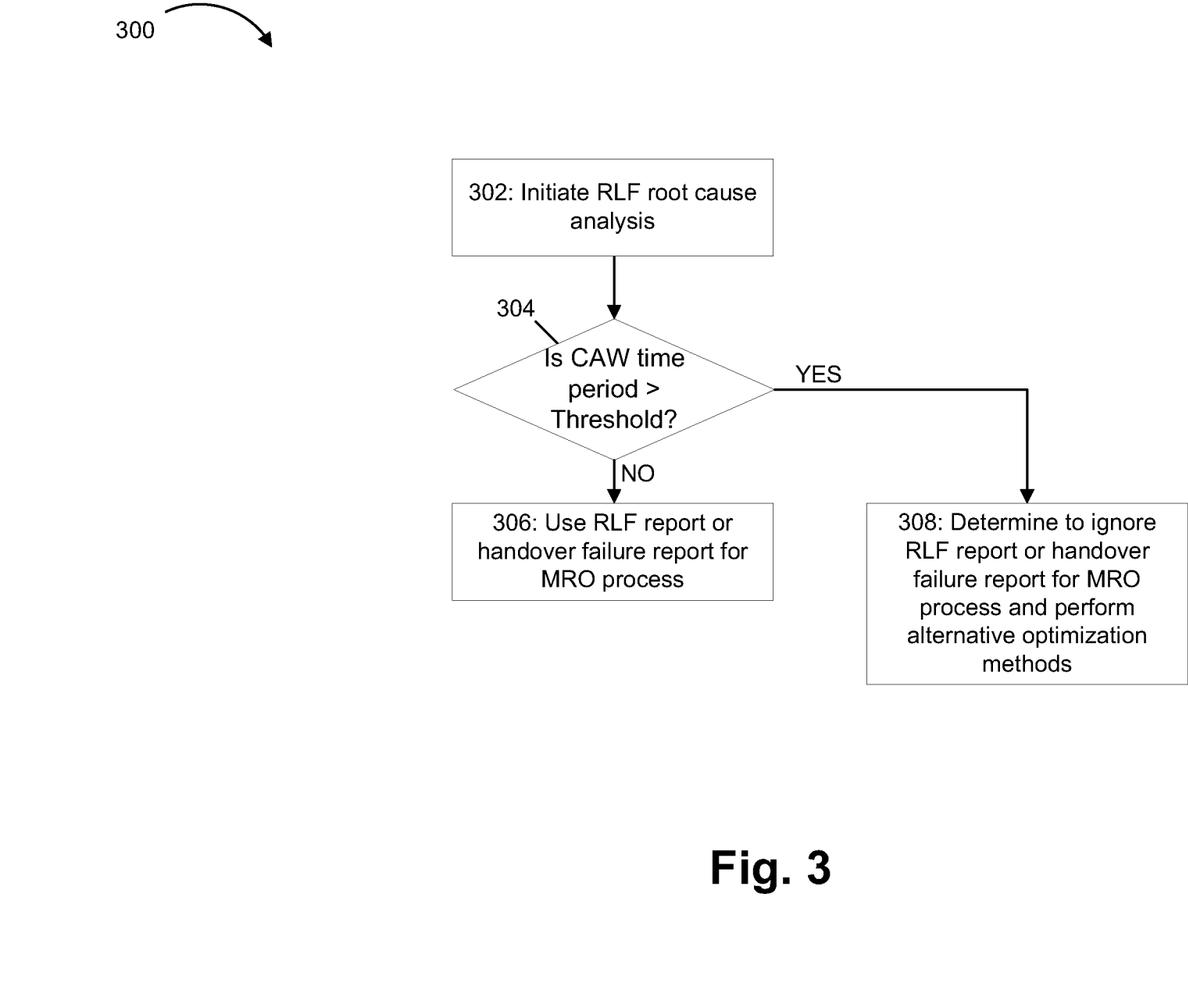
FIG. 3 illustrates an example flow diagram of a method of using channel access waiting (CAW) time period information for self-optimizing network mobility robustness optimization, according to some embodiments.

Certain information described herein may be used for SON (MRO). The CAW time period may be part of the RLF report or separately delivered, e.g., via UE information request or response procedure, as described above. In the course of the RLF root cause analysis carried out by the network node, the CAW time period information may be checked against a configured threshold. The root cause analysis may vary by implementation of specific SON agents running on the network node at the corresponding cell where the CAW time period is measured. If the RLF has been identified as a mobility failure (derived from other MRO information elements reported in the RLF report), and based on the NR-U application, the CAW time period information may be investigated. FIG. 3 below illustrates an example of how the implementation-specific aspects of the MRO algorithm may use the CAW time period information.

As described above, FIG. 2 is provided as an example. Other examples are possible, according to some embodiments.

FIG. 3 illustrates an example flow diagram of a method 300 of using CAW time period information for self-optimizing network (SON) mobility robustness optimization (MRO), according to some embodiments. For example, FIG. 3 may illustrate example operations of a network node (e.g., the network node illustrated in FIG. 2).

The method 300 may include, at 302, initiating an RLF root cause analysis. The method 300 may include, at 304, determining whether the CAW time period exceeds (or greater than or equal than) a threshold. As illustrated at 306, if the CAW time period does not exceed (or less than or equal to) the threshold (304—NO), then the method 300 may include using an RLF report or a handover failure report for an MRO process. For example, the RLF report may be received from a UE (e.g., at 204 of FIG. 2). In some embodiments, during the using at 306, the RLF report may be used for a MRO process to generate mobility failure metric statistics. As illustrated at 308, if the CAW time period exceed (or greater than or equal to) the threshold (304—YES), then the method 300 may include determining to ignore the RLF report or handover failure report for the MRO process and may perform alternative optimization methods regarding the channel access-specific functionality assuming that network failure is due to LBT delay. For example, the RLF report or handover failure may be ignored for the MRO process, since NR-U aspects may impede the MRO process (e.g., network failure may be due to LBT failures and not due to an incorrect MRO decision). In this case, the method 300 may perform a SON method for LBT optimization or another channel access-specific SON method.

As indicated above, FIG. 3 is provided as an example. Other examples are possible, according to some embodiments.

Figure 4:
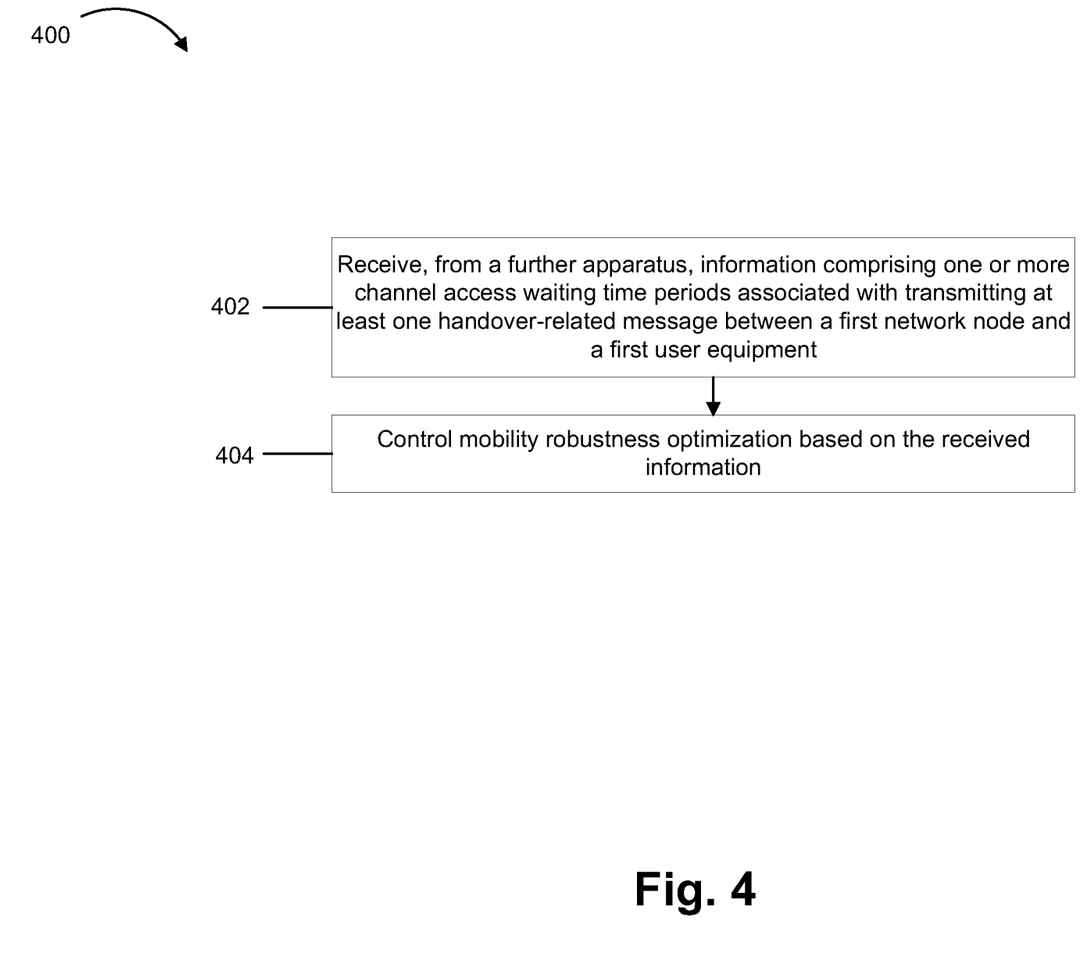
FIG. 4 illustrates an example flow diagram of a method, according to some embodiments.

FIG. 4 illustrates an example flow diagram of a method 400, according to some embodiments. For example, FIG. 4 may illustrate example operations of a second network node (e.g., apparatus 11 illustrated in, and described with respect to, FIG. 6a, or network node 220 in FIG. 2). Some of the operations illustrated in FIG. 4 may be similar to some operations shown in, and described with respect to, FIGS. 1 and 2.

In an embodiment, the method 400 may include, at 402, receiving, from a further apparatus, information comprising one or more channel access waiting time periods associated with transmitting at least one handover-related message between a first network node and a first user equipment, e.g., in a manner similar to that at 204 of FIG. 2. The further apparatus may include the first user equipment (e.g., UE 210 in FIG. 2 or apparatus 20 in FIG. 6b) or the first network node. The method 400 may include, at 404, controlling mobility robustness optimization based on the received information, e.g., in a manner similar to that at 206 of FIG. 2.

In some embodiments, the method illustrated in FIG. 4 may include one or more additional aspects described below or elsewhere herein. In some embodiments, the one or more channel access waiting time periods may start with having an associated handover-related message in a transmission buffer and may end with obtaining a channel for transmission of the associated handover-related message or receiving an acknowledgement or negative acknowledgement from a receiver of the associated handover-related message.

In some embodiments, the information may further include one or more of: a serving cell identifier associated with a channel access waiting time period of the one or more channel access waiting time periods measured during the preparation phase, or a target cell identifier associated with a channel access waiting time period of the one or more channel access waiting time periods measured during the execution phase. In some embodiments, the stored information may include one or more of a channel access waiting time period during the preparation phase between an event trigger and transmitting a measurement report (e.g., measurementEventReportCAW), and/or a channel access waiting time period during the execution phase between an execution condition for the handover being met and transmitting the handover-related message (e.g., RACHtotargetcellCAW).

In some embodiments, the controlling at 404 may include performing a root cause analysis for a radio link failure or a handover failure of the first user equipment based on the information (e.g., in a manner similar to that 304 of FIG. 3), and controlling the mobility robustness optimization based on the root cause analysis (e.g., in a manner similar to that at 306 or 308 of FIG. 3). In some embodiments, the performing the root cause analysis may include determining whether the one or more channel access waiting time periods exceed a threshold, e.g., in a manner similar to that at 304 of FIG. 3.

In some embodiments, the controlling at 404 may include determining to use an RLF report or a handover failure report for the mobility robustness optimization if the threshold is not exceeded (e.g., in a manner similar to that at 306 of FIG. 3), or determining to not use the RLF report or the handover failure report for the mobility robustness optimization if the threshold is not exceeded (e.g., in a manner similar to that at 308 of FIG. 3). In some embodiments, the information comprising the one or more channel access waiting time periods may include at least one channel access waiting time period for a preparation phase of a handover procedure of the first user equipment and/or at least one channel access waiting time period for an execution phase of the handover procedure.

In some embodiments, the method 400 may further include sending a request for the report to the first user equipment.

In some embodiments, the method 400 may further include measuring, during a handover procedure (e.g., a handover or conditional handover procedure) of a second user equipment, one or more channel access waiting time periods (e.g., the $2^{nd}$ and/or $4^{th}$ CAW time period shown in FIG. 1) associated with transmitting at least one handover-related message between a first network node and the second user equipment.

In some embodiments, the method 400 may further include sending the information comprising the one or more channel access waiting time periods (e.g., the CAW time period measured for the second user equipment) to another apparatus. In some embodiments, the second network node may receive information comprising the one or more channel access waiting time periods related to the first user equipment from another apparatus. For example, the second network node may receive information related to UL CAW of the first user equipment from the first user equipment, and receive information related to DL CAW of the first user equipment from the first network node.

As described above, FIG. 4 is provided as an example. Other examples are possible according to some embodiments.

Figure 5:
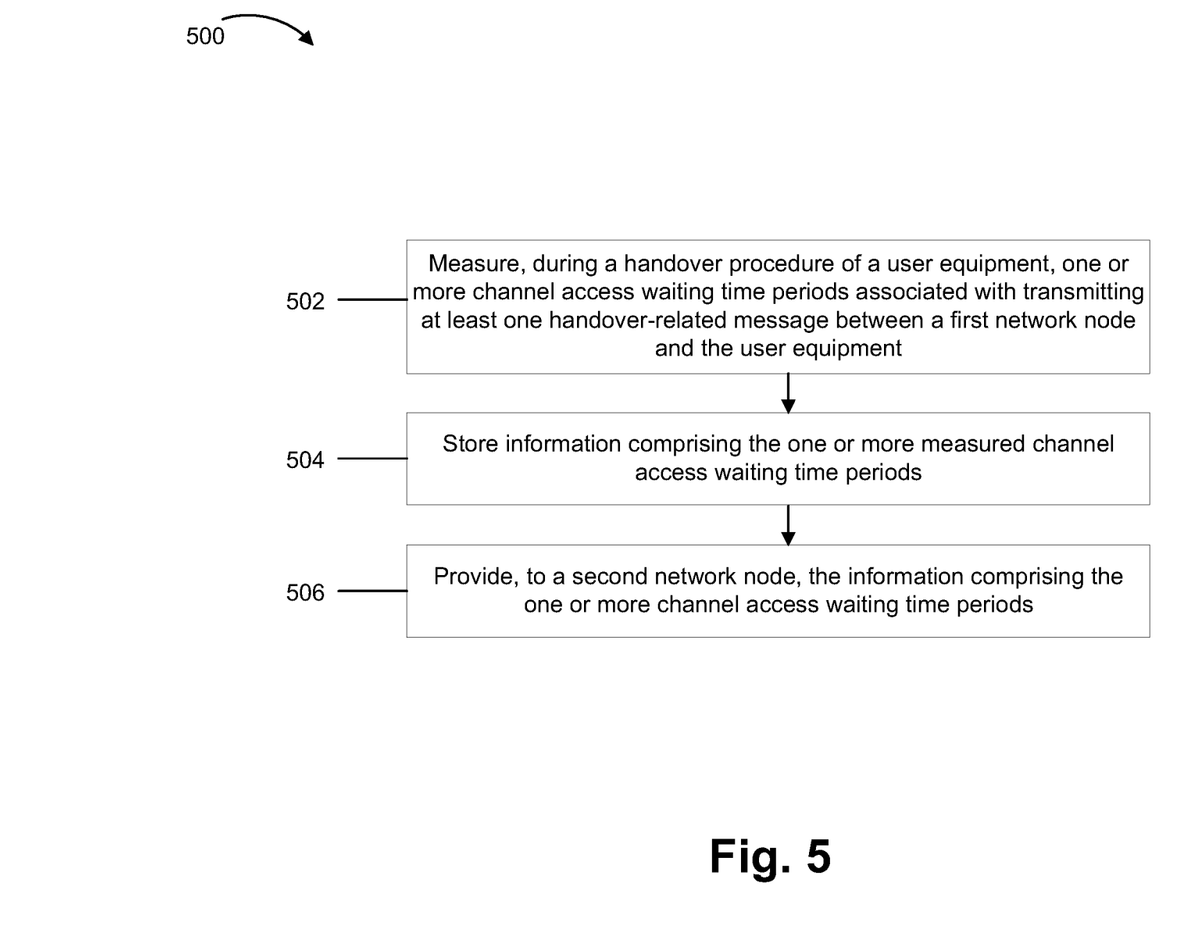
FIG. 5 illustrates an example flow diagram of a method, according to some embodiments.

FIG. 5 illustrates an example flow diagram of a method 500, according to some embodiments. For example, FIG. 5 may illustrate example operations of an apparatus, which may comprise a UE (e.g., apparatus 20 illustrated in, and described with respect to, FIG. 6b, or UE 210 in FIG. 2) or a network node (e.g., apparatus 11 illustrated in, and described with respect to, FIG. 6a, or network node 220 in FIG. 2). Some of the operations illustrated in FIG. 5 may be similar to some operations shown in, and described with respect to, FIGS. 1 and 2.

In an embodiment, the method 500 may include, at 502, measuring, during a handover procedure of a user equipment, one or more channel access waiting time periods associated with transmitting at least one handover-related message between a first network node and the user equipment, e.g., in a manner similar to that at 202 of FIG. 2. The method 500 may further include, at 504, storing information comprising the one or more measured channel access waiting time periods. The method 500 may further include, at 506, providing, to a second network node, the information comprising the one or more channel access waiting time periods, e.g., in a manner similar to that at 204 of FIG. 2.

The method 500 illustrated in FIG. 5 may include one or more additional aspects described below or elsewhere herein. In some embodiments, the one or more channel access waiting time periods may start with having an associated handover-related message in a transmission buffer and may end with obtaining a channel for transmission of the associated handover-related message or receiving an acknowledgement or negative acknowledgement from a receiver of the associated handover-related message. In some embodiments, at 506 the apparatus may provide the information included in a radio link failure report to the second network node, wherein the one or more channel access waiting time periods comprises one or more uplink channel access waiting time periods. In some embodiments, at 506 the apparatus may provide the information based on a request from the second network node. For example, UE 210 may provide the information in a UE information request and response procedure, or a first network node may provide the information to the second network node based on a request from the second network node.

In some embodiments, the measuring at 502 may include measuring at least one channel access waiting time period for a preparation phase of the handover procedure and/or at least one channel access waiting time period for an execution phase of the handover procedure. In some embodiments, the information may further include a serving cell identifier associated with a channel access waiting time period of the one or more channel access waiting time periods measured during the preparation phase. Additionally, or alternatively, the information may further include a target cell identifier associated with a channel access waiting time period of the one or more channel access waiting time periods measured during the execution phase. In some embodiments, the stored information may include one or more of a channel access waiting time period during the preparation phase between an event trigger and transmitting the measurement report (e.g., measurementEventReportCAW), and/or a channel access waiting time period during the execution phase between an execution condition for the handover being met and transmitting the handover-related message (e.g., RACHtotargetcellCAW).

As described above, FIG. 5 is provided as an example. Other examples are possible according to some embodiments.

Figure 6A:
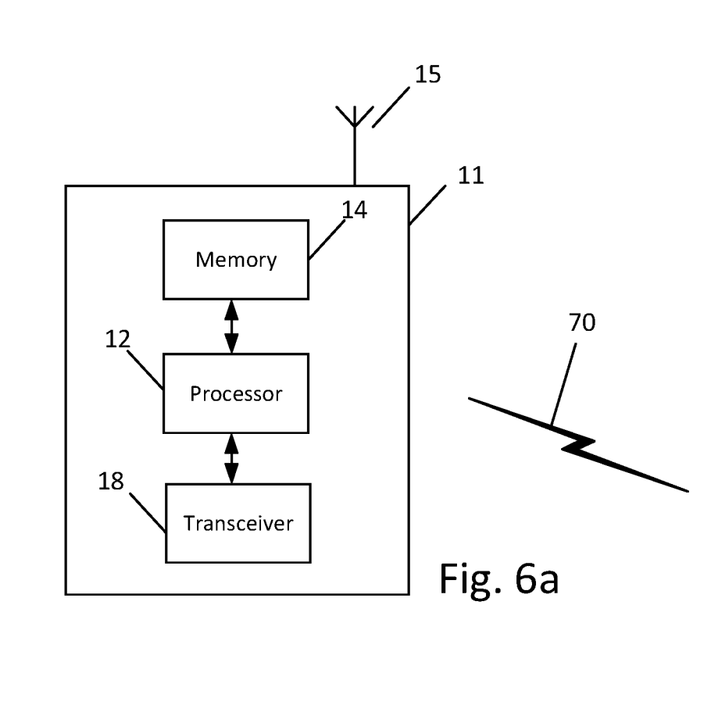
FIG. 6a illustrates an example block diagram of an apparatus, according to an embodiment.

FIG. 6a illustrates an example of an apparatus 11 according to an embodiment. In an embodiment, apparatus 11 may be a node, host, or server in a communications network or serving such a network. For example, apparatus 11 may be a network node, satellite, base station, a Node B, an evolved Node B (eNB), 5G Node B or access point, next generation Node B (NG-NB or gNB), and/or a wireless local area network (WLAN) access point, associated with a radio access network, such as a LTE network, 5G or NR. In some example embodiments, apparatus 11 may be an eNB in LTE or gNB in 5G.

It should be understood that, in some example embodiments, apparatus 11 may comprise an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 11 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 11 may include components or features not shown in FIG. 6a.

As illustrated in the example of FIG. 6a, apparatus 11 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 6a, multiple processors may be utilized according to other embodiments. For example, it should be understood that, in certain embodiments, apparatus 11 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 11, which may include, for example, precoding of antenna gain/phase parameters, encoding and decoding of individual bits forming a communication message, formatting of information, and overall control of the apparatus 11, including processes related to management of communication or communication resources.

Apparatus 11 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can comprise any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 11 to perform tasks as described herein.

In an embodiment, apparatus 11 may further include or be coupled to (internal or external) a drive or port that is configured to accept and read an external computer readable storage medium, such as an optical disc, universal serial bus (USB) drive, flash drive, or any other storage medium. For example, the external computer readable storage medium may store a computer program or software for execution by processor 12 and/or apparatus 11.

In some embodiments, apparatus 11 may also include or be coupled to one or more antennas 15 for transmitting and receiving signals and/or data to and from apparatus 11. Apparatus 11 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of global system for mobile communications (GSM), narrow band Internet of Things (NB-IoT), LTE, 5G, wireless local area network (WLAN), Bluetooth (BT), Bluetooth Low Energy (BT-LE), near-field communication (NFC), radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 11. In other embodiments, transceiver 18 may be capable of transmitting and receiving signals or data directly. Additionally or alternatively, in some embodiments, apparatus 11 may include an input and/or output device (I/O device).

In an embodiment, memory 14 may store software modules that provide functionality when executed by processor 12. The modules may include, for example, an operating system that provides operating system functionality for apparatus 11. The memory may also store one or more functional modules, such as an application or program, to provide additional functionality for apparatus 11. The components of apparatus 11 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 11) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 11 may be a network node or radio access network (RAN) node, such as a base station, access point, Node B, eNB, gNB, WLAN access point, or the like.

According to certain embodiments, apparatus 11 may be controlled by memory 14 and processor 12 to perform the functions associated with any of the embodiments described herein, such as some operations illustrated in, or described with respect to, FIGS. 1-4. For instance, apparatus 11 may be controlled by memory 14 and processor 12 to perform the method of FIG. 4.

Figure 6B:
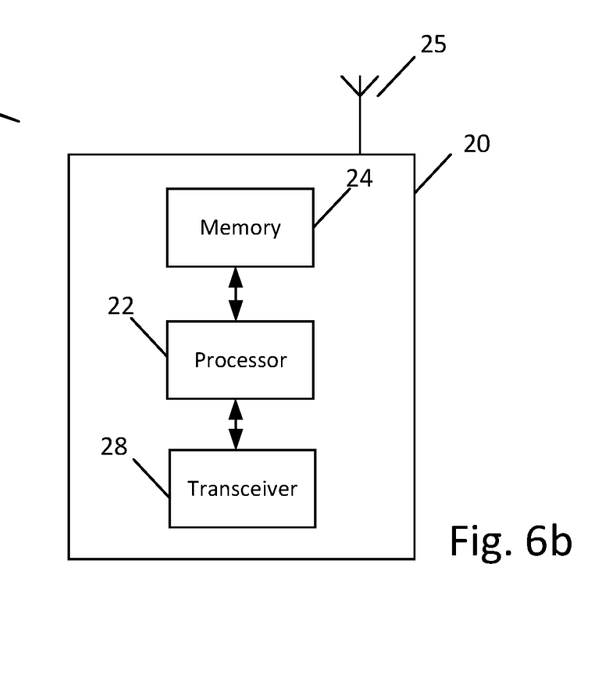
FIG. 6b illustrates an example block diagram of an apparatus, according to another embodiment.

FIG. 6b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like.

As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE advanced (LTE-A), NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 6b.

As illustrated in the example of FIG. 6b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 6b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can comprise any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as orthogonal frequency divisional multiple access (OFDMA) symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 11 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry. As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with any of the embodiments described herein, such as some operations illustrated in, or described with respect to, FIGS. 1, 2, and 5. For instance, in one embodiment, apparatus 20 may be controlled by memory 24 and processor 22 to perform the method of FIG. 5.

In some embodiments, an apparatus (e.g., apparatus 11 and/or apparatus 20) may include means for performing a method or any of the variants discussed herein, e.g., a method described with reference to FIGS. 3 and 4. Examples of the means may include one or more processors, memory, and/or computer program code for causing the performance of the operation.

Therefore, certain example embodiments provide several technological improvements, enhancements, and/or advantages over existing technological processes. For example, one benefit of some example embodiments is reliable detection of channel access failures from other mobility-related problems when MRO is used. Accordingly, the use of some example embodiments results in improved functioning of communications networks and their nodes and, therefore constitute an improvement at least to the technological field of mobility failure, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations used for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 11 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein apply equally to both singular and plural implementations, regardless of whether singular or plural wording is used in connection with describing certain embodiments. For example, an embodiment that describes operations of a single network node equally applies to embodiments that include multiple instances of the network node, and vice versa.

One having ordinary skill in the art will readily understand that the example embodiments as discussed above may be practiced with operations in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

Partial Glossary

AUM Autonomous UE mobility
CAW Channel Access Waiting
CHO Conditional Hand Over
HOF Handover Failure
LAA License Assisted Access
LBT Listen Before Talk
LTE-U LTE-Unlicensed
MRO Mobility Robustness Optimization
NB NodeB
RACH Random Access Channel
RAR Random Access Response
RLF Radio Link Failure
SON Self Optimizing Network
TTT Time-To-Trigger

We claim:

1. An apparatus, comprising:
at least one processor; and
at least one memory including computer program code,
wherein the at least one memory and the computer program code are configured to, with the at least one processor, cause the apparatus at least to:
measure, during a handover procedure of a user equipment, one or more channel access waiting time periods associated with transmitting at least one handover-related message between a first network node and the user equipment;
store information comprising the one or more measured channel access waiting time periods; and
provide, to a second network node, the information comprising the one or more channel access waiting time periods,
wherein the one or more channel access waiting time periods start with having an associated handover-related message in a transmission buffer and ends with obtaining a channel for transmission of the associated handover-related message or receiving an acknowledgement or negative acknowledgement from a receiver of the associated handover-related message.

2. The apparatus according to claim 1, wherein the at least one memory and the computer program code are configured to, with the at least one processor, further cause the apparatus, when providing the information comprising the one or more channel access waiting time periods, at least to:
provide the information included in a radio link failure report, wherein the one or more channel access waiting time periods comprises one or more uplink channel access waiting time periods.

3. The apparatus according to claim 1, wherein the at least one memory and the computer program code are configured to, with the at least one processor, further cause the apparatus, when providing the information comprising the one or more channel access waiting time periods, at least to:
provide the information based on a request from the second network node.

4. The apparatus according to claim 1, wherein the at least one memory and the computer program code are configured to, with the at least one processor, further cause the apparatus, when measuring the one or more channel access waiting time periods, at least to:
measure at least one channel access waiting time period for a preparation phase of the handover procedure and/or at least one channel access waiting time period for an execution phase of the handover procedure.

5. The apparatus according to claim 4, wherein the information further comprises one or more of:
a serving cell identifier associated with a channel access waiting time period of the one or more channel access waiting time periods measured during the preparation phase, or
a target cell identifier associated with a channel access waiting time period of the one or more channel access waiting time periods measured during the execution phase.

6. The apparatus according to claim 4, wherein the stored information comprises one or more of:
a channel access waiting time period during the preparation phase between an event trigger and transmitting a measurement report, or
a channel access waiting time period during the execution phase between an execution condition for the handover being met and transmitting the handover related message.

7. An apparatus, comprising:
at least one processor; and
at least one memory including computer program code,
wherein the at least one memory and the computer program code are configured to, with the at least one processor, cause the apparatus at least to:
receive, from a further apparatus, information comprising one or more channel access waiting time periods associated with transmitting at least one handover-related message between a first network node and a first user equipment; and
control mobility robustness optimization based on the received information,
wherein the one or more channel access waiting time periods start with having an associated handover-related message in a transmission buffer and ends with obtaining a channel for transmission of the associated handover-related message or receiving an acknowledgement or negative acknowledgement from a receiver of the associated handover-related message.

8. The apparatus according to claim 7, wherein the at least one memory and the computer program code are configured to, with the at least one processor, further cause the apparatus, when controlling the mobility robustness optimization, at least to:
perform a root cause analysis for a radio link failure or a handover failure of the first user equipment based on the information; and
control the mobility robustness optimization based on the root cause analysis.

9. The apparatus according to claim 8, wherein the at least one memory and the computer program code are configured to, with the at least one processor, further cause the apparatus, when performing the root cause analysis, at least to:
determine whether the one or more channel access waiting time periods exceed a threshold.

10. The apparatus according to claim 9, wherein the at least one memory and the computer program code are configured to, with the at least one processor, further cause the apparatus, when controlling the mobility robustness optimization, at least to:
  determine not to use a radio link failure report or a handover failure report for the mobility robustness optimization if the threshold is exceeded, or
  determine to use the radio link failure or the handover failure report for the mobility robustness optimization if the threshold is not exceeded.

11. The apparatus according to claim 7 wherein the information comprising the one or more channel access waiting time periods comprises one or more of:
  at least one channel access waiting time period for a preparation phase of a handover procedure of the first user equipment and/or at least one channel access waiting time period for an execution phase of the handover procedure.

12. A method, comprising:
  measuring, during a handover procedure of a user equipment, one or more channel access waiting time periods associated with transmitting at least one handover-related message between a first network node and the user equipment;
  storing information comprising the one or more measured channel access waiting time periods; and
  providing, to a second network node, the information comprising the one or more channel access waiting time periods,
  wherein the one or more channel access waiting time periods start with having an associated handover-related message in a transmission buffer and ends with obtaining a channel for transmission of the associated handover-related message or receiving an acknowledgement or negative acknowledgement from a receiver of the associated handover-related message.

13. The method according to claim 12, wherein the providing of the information comprising the one or more channel access waiting time periods further comprises:
  providing the information included in a radio link failure report, wherein the one or more channel access waiting time periods comprises one or more uplink channel access waiting time periods.

14. The method according to claim 12, wherein the providing of the information comprising the one or more channel access waiting time periods further comprises:
  providing the information based on a request from the second network node.

15. The method according to claim 12, wherein the measuring of the one or more channel access waiting time periods further comprises
  measuring at least one channel access waiting time period for a preparation phase of the handover procedure and/or at least one channel access waiting time period for an execution phase of the handover procedure.

16. The method according to claim 15, wherein the information further comprises one or more of:
  a serving cell identifier associated with a channel access waiting time period of the one or more channel access waiting time periods measured during the preparation phase, or
  a target cell identifier associated with a channel access waiting time period of the one or more channel access waiting time periods measured during the execution phase.

17. The method according to claim 15, wherein the stored information comprises one or more of:
  a channel access waiting time period during the preparation phase between an event trigger and transmitting a measurement report, or
  a channel access waiting time period during the execution phase between an execution condition for the handover being met and transmitting the handover related message.

* * * * *